United States Patent [19]

Montalvo

[11] 4,419,331
[45] Dec. 6, 1983

[54] SULPHUR DIOXIDE CONVERTER AND POLLUTION ARRESTER SYSTEM

[75] Inventor: Victor H. Montalvo, Owensboro, Ky.

[73] Assignee: Michael F. Walters, Owensboro, Ky.; a part interest

[21] Appl. No.: 367,419

[22] Filed: Apr. 12, 1982

[51] Int. Cl.³ .............................................. B01D 50/00
[52] U.S. Cl. ...................................... 422/170; 55/73;
 55/93; 55/95; 55/223; 55/228; 55/238; 55/255;
 55/256; 55/257 R; 55/260; 261/3; 261/18 R;
 261/22; 261/79 A; 261/121 R; 261/124;
 261/DIG. 9; 422/189; 423/242; 423/535
[58] Field of Search ................. 422/4, 5, 168, 169,
 422/172, 188, 189, 231, 170; 55/73, 93–95, 223,
 228, 229, 237, 238, 255, 256, 257 R, 260;
 261/3–8, 22, 18 R, 79 A, 118, 119 R, 121 R,
 124, DIG. 9; 423/242, 535

[56] References Cited

U.S. PATENT DOCUMENTS

| | | | |
|---|---|---|---|
| 3,353,335 | 11/1967 | Caballero | 55/223 X |
| 3,504,481 | 4/1970 | Zakarian et al. | 55/223 X |
| 3,572,264 | 3/1971 | Mercer | 55/223 X |
| 3,574,562 | 4/1971 | Kawahata | 423/242 R X |
| 4,251,486 | 2/1981 | Sohda | 55/223 X |
| 4,294,723 | 10/1981 | Hara et al. | 423/535 X |
| 4,368,060 | 1/1983 | Yanagiako et al. | 422/168 X |

*Primary Examiner*—Richard L. Chiesa
*Attorney, Agent, or Firm*—Warren D. Flackbert

[57] ABSTRACT

A sulphur dioxide converter and pollution arrester system which involves the treatment of smoke and/or contaminated air emanating from a combustion area by passage through a zone achieving turbulence into a water spray contained first treating chamber. The turbulence zone, into which an atomized catalyst is introduced, serves to create a longer path for cooling as well as increased centrifugal motion to the solid particles in the contaminated air and also the formation of sulphur trioxide. In other words, the arrangement is such that pollution arresting action is provided in the form of "slinging" resulting from tangential directional movement and, when combining with the water spray in the first treating chamber, the ultimate formation of sulphuric acid.

Subsequently, the contaminated air, containing amounts of sulphurous and sulphuric acids, passes through a second treating chamber, where airflow throughout the system is occasioned by action at the outlet end, such as the vacuum created by a flue and not by independent mechanical means. The arrangement serves to a twofold purpose, i.e. to minimize or arrest pollution and to convert sulphur dioxide, a component of high sulphur coal, into commercially valuable sulphuric acid.

9 Claims, 7 Drawing Figures

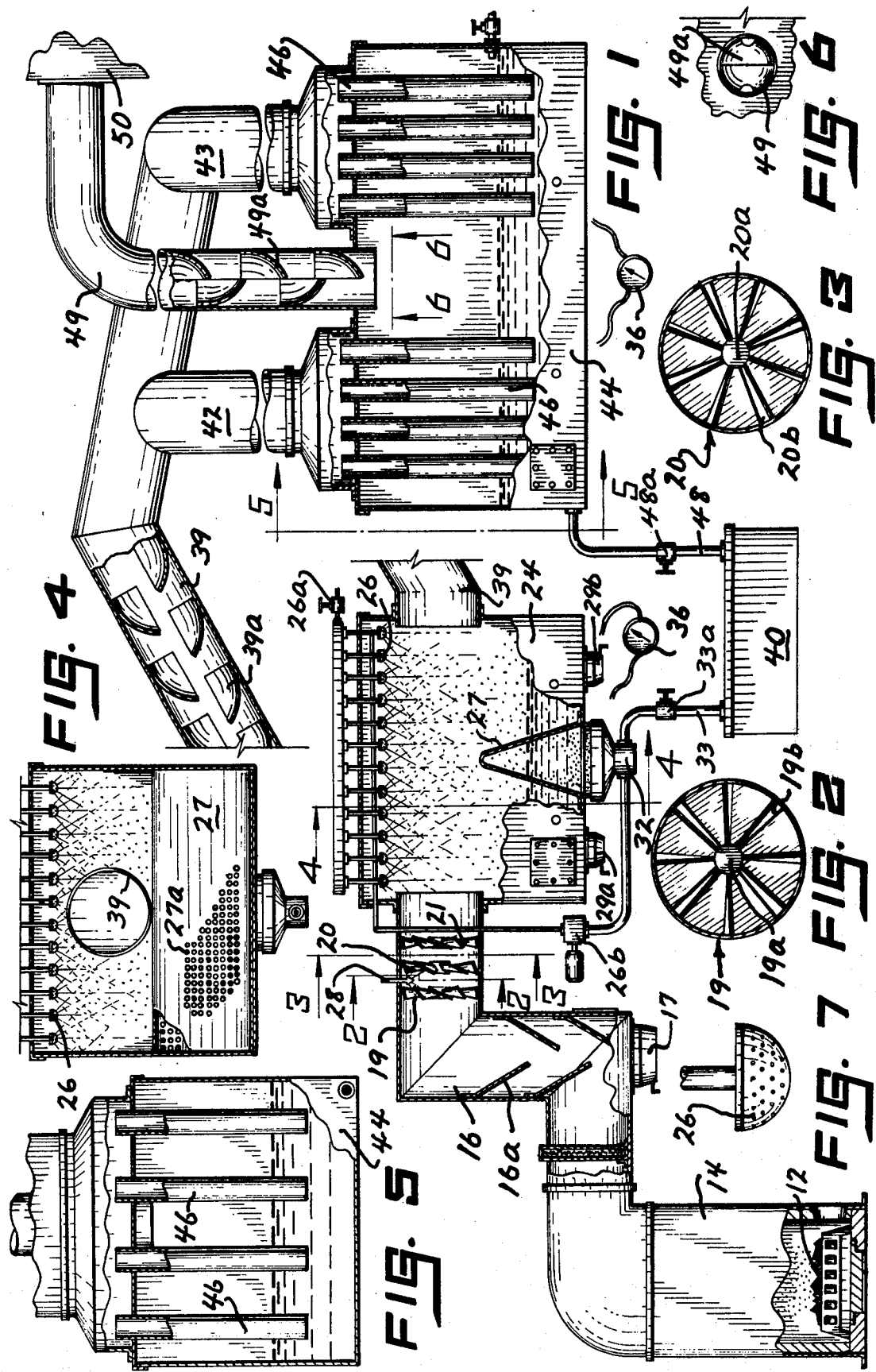

SULPHUR DIOXIDE CONVERTER AND POLLUTION ARRESTER SYSTEM

As is known, environment and ecology is of prime concern, particularly, for example, air pollution, the latter being prevalent almost everywhere, but largely dominant in regions having significant power needs. In this connection, the necessity of combustion for a manufacturing facility inherently promotes pollution in the air, especially where high sulphur content coal is used as the basis for the desired power.

As a result of the preceding, considerable attention has been directed to the development of equipment which removes, or at least minimizes, dust and waste matter entrained in smoke and/or contaminated air as a result of sulphur dioxide containing fuel. In other words, the provision of an effective pollutant arrester system has been a key objective to many and is satisfied by the invention.

Moreover, the smoke occasioned from the use of fuel which contains a high amount of sulphur dioxide can also serve, as an end-by-product, in the production of sulphuric acid, a substance having a valuable commercial usage, being another feature of the invention. In this connection, production of sulphuric acid would be occasioned through the atomizing of the sulphur dioxide of the high sulphur content coal first into a sulphur trioxide form, through the use of a catalyst, and, thereafter, into the desired sulphuric acid.

Broadly, the system of the invention includes a source of smoke and/or contaminated air emanating from a combustion gas and passing through a zone serving to create turbulence. A catalyst, vanadium pentoxide, is atomized into the turbulence zone, serving to promote the sulphur dioxide into sulphur trioxide.

The contaminated air is thereafter drawn through a first treating chamber characterized by the flow of a fine mist, spray, water droplets or the like, effecting the provision of sulphuric acid. The moving contaminated air follows a centrifugal pattern, achieving a "slinging" effect due to tangential movement, achieving, as a result, the effective arresting of larger size pollutants present in the contaminated air and the production of sulphuric acid in the first treating chamber. Thus, an important two-fold objective is realized.

In any event, the first treated contaminated air, now including sulphurous acid and a small amount of sulphuric acid, then passes through a second treating chamber and ultimately to a flue, where, it should be understood that flue action is the sole cause of the contaminated air movement in that no mechanical equipment is involved in the performance of the closed system invention. As to the second treating chamber, the contaminated air is further cleansed of unwanted dust and particle waste matter, being drawn into and through a volume of liquid and, thereafter, passing to the outside atmosphere through the flue. Again, a further concentration of sulphuric acid is attained.

In any event, the system also includes various deflectors which serve to disrupt contaminated airflow, being distributed in the ductwork from the source of contaminated air, between the first and second treating chambers, and in the ductwork to the flue. The deflectors in the latter are particularly important in permitting the gravity return of any liquid sulphuric acid which may be entrained in the air passing to the flue back into the second treating chamber.

A better understanding of the present invention will become more apparent, however, from the following description, taken in conjunction with the accompanying drawing, wherein FIG. 1 is a view in elevation, partly broken away and partly in vertical section, showing a sulphur dioxide converter and pollution arrester system in accordance with the teachings of the instant invention;

FIG. 2 is another view in elevation, taken at line 2—2 of FIG. 1 and looking in the direction of the arrows, showing details of a deflector employed in generating turbulence for the contaminated air passing through the system;

FIG. 3 is still another view in elevation, taken at line 3—3 on FIG. 1 and looking in the direction of the arrows, showing a second deflector is a displaced rotational relationship with that shown in FIG. 2;

FIG. 4 is still a further view in elevation, taken at line 4—4 on FIG. 1 and looking in the direction of the arrows, showing certain details of the first treating chamber of the invention;

FIG. 5 is a view in elevation, partly broken away, taken at line 5—5 on FIG. 1 and looking in the direction of the arrows, showing certain details of the second treating chamber of the invention;

FIG. 6 is an end view of the conduit leading from the second treating chamber to the flue, taken at line 6—6 on FIG. 1 and looking in the direction of the arrows; and, FIG. 7 is an enlarged detailed view of one of the atomizer nozzles typically employed in the practice of the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, the sulphur dioxide converter and pollution arrester system of the invention is disclosed in combination with a source of combustion which produces smoke and fumes, i.e. contaminated air including various size particles and in the instance of a high sulphur content fuel, as certain coal, sulphur dioxide. In a typical manufacturing installation, fuel source 12 (representatively shown) is arranged within a housing 14, where the latter communicates with ductwork leading the smoke and/or contaminated air into the system of the invention. As stated heretofore, movement of the contaminated air is caused solely by the vacuum created at the outlet end, i.e. the flue, chimney, turbine or the like, i.e. no mechanical air moving equipment is involved.

In any event, a duct 16, including deflector plates or baffles 16a, angled downwardly to permit the passage or sliding of larger unwanted particles to and for removal at an access door 17, leads into a turbulence producing zone defined by a series of deflectors 19, 20 and 21, rotatably displaced one with respect to another for optimum turbulence reasons (see FIGS. 2 and 3, for example). As evident, the deflectors 19, 20 and 21 each respectively include a hub 19a, 20a and 21a (not detailed) from which propeller type vanes 19b, 20b and 21b (also not detailed) radially extend. As should be understood, the deflectors create a circular contaminated air pattern, where the contaminated air is then introduced into a first treating chamber 24.

An atomizer 28, typically disposed between deflectors 19 and 20, serves to spray a catalyst into the turbulent contaminated air, changing the sulphur dioxide into sulphur trioxide and, in view of the water solubility thereof, a small degree of sulphurous acid. The catalyst, vanadium pentoxide, $V_2O_5$, is a solid dissolvable in water, as, for example, 1 gram of vanadium pentoxide per 125 grams of water.

As evident in FIG. 1, and also in FIG. 4, the first treating chamber 24 includes a series of atomizer nozzles 26 typically supported on the upper wall thereof and, if desired, in staggered rows. An outside water source (not shown), controlled by a valve 26a and including an electrically controlled recirculating mechanism 26b, serves to introduce a fine spray of water into the first treating chamber 24 through the aforesaid atomizer nozzles 26 (see FIG. 7). The atomized spray serves to convert the sulphur trioxide, introduced from the turbulence zone, into sulphuric acid.

Disposed at the bottom of the first treating chamber 24 and extending laterally there across is an "upside-down" or inverted V-shaped deflector 27 containing a series of openings 27a on opposite sides, as particularly evident in FIG. 4. The deflector 27 principally serves liquid and solid separation purposes, i.e. where the accumulated solid waste particles may be removed through access doors 29a and 29b disposed on either side of the deflector 27 in the bottom wall of the first treating chamber 24.

Liquid, in the form of sulphuric acid, passes through outlet 32 which selectively communicates with recirculating mechanism 26b or through a check valve 33a in line 33 to an auxiliary tank 40. A pH instrument 36 is provided to establish the acetic content of the sulphuric acid in the first treating chamber 24 during operation of the system, i.e. permits the visual monitoring of the pH level. Restated otherwise, when a preselected pH level is obtained, the outlet 32 beneath the deflector 27 is caused to permit the flow of sulphuric acid into the auxiliary tank 40. Outlet 32 is, typically, solenoid controlled.

In that the invention is directed to a closed system, a duct 39, disposed on an opposite side wall of the first treating chamber 24, and also including baffles or deflector plates 39a therein, communicates through ducts 42 and 43 to a second treating chamber 44. Each of the aforesaid ducts 42-43 empties into a series of upstanding conduits 46, supported on the top wall of the second treating chamber 44, which extend downwardly into and below a volume of water at the bottom of the second treating chamber 44.

In other words, the moving contaminated air, containing small amounts of sulphurous acid and sulphuric acid, is treated further by the passage thereof through conduits 46 into the water and, thereafter, upwardly into a duct 49 which passes, for example, to a flue 50. The preceding serves not only still further anti-pollution purposes but, as well, causes the water in the second treating chamber 44 to create more sulphuric acid. Again, with the assistance of pH instrument 36, the pH level of the liquid (sulphuric acid) in the second treating tank 44 is monitored and subsequently withdrawn to the auxiliary reservoir 40 through a check valve 48a in line 48.

Importantly, the duct 49 also contains baffles or deflectors 49a, where the arrangement is such that any droplets of water containing sulphuric acid, which may pass into the duct 49, are returned by gravity into the volume of the liquid (sulphuric acid) in the second treating tank 44. In other words, the possibility of equipment rusting and/or failure is minimized in that no mechanical pump or the like is required for total system operation.

From the preceding, it should be evident that the invention, as a closed system, and operable independently of mechanical equipment, i.e. through vacuum action, affords an effective approach to arrest pollutants and, at the same time, to convert sulphur dioxide in contaminated air, with the aid of the aforesaid catalyst, to sulphuric acid. An important aspect of the invention is the turbulence created in the inlet passageway to the first treating chamber, serving particle separation, and the further separation achieved by the deflector at the bottom of the first treating chamber. Further importance lies in the gravity return of water droplets into the second treating chamber in the instance of entrapment caused by vacuum flow.

Contaminated air movement is also obstructed throughout the system by the selective use of baffles and/or deflectors in various conduits or passageways. Moreover, the usage of water or liquid recirculation in the first treating chamber serves for efficiently attaining the maximum amount of sulphuric acid occasioned by the coal combustion.

The preceding arrangement is susceptible to various changes within the spirit of the invention as, for example, the specific type of atomizers employed; the arrangement of the atomizers; the type of recirculation afforded in the first treating chamber; the number of conduits extending into the volume of water in the second treating chamber; the placement of the deflectors and/or baffles to disrupt and/or define a tortuous flow path of contaminated air; and, the like. Thus, the above description should be considered illustrative and not as limiting the scope of the following claims:

I claim:

1. A sulphur dioxide converter and pollution arresting system comprising a source of smoke containing sulphur dioxide, ductwork directing the movement of said smoke into a first treating chamber, said ductwork including a turbulence creating zone, means introducing a catalyst into said ductwork, said first treating chamber having a series of outlets therein passing atomized liquid directly downwardly by gravity through the path of movement of said smoke, a deflector disposed within said first treating zone serving solid and liquid separating purposes, a second treating chamber communicating with said first treating chamber, said second treating chamber positioning a series of depending conduits for passage of said smoke and including a volume of liquid at the bottom thereof into which said series of conduits extend and into which said smoke is introduced, an outlet duct directly communicating with said second treating chamber at the top thereof and above the level of said liquid and arranged to permit liquid entrained in smoke passing from said second treating chamber to return by gravity flow into said second treating chamber, and a flue communicating with said outlet duct achieving the vacuum flow of said smoke through said system, said sulphur dioxide in said smoke combining with said catalyst and said liquid in said first and said second treating chamber to produce sulphuric acid.

2. The system of claim 1 where said means introduces said catalyst into said turbulence creating zone.

3. The system of claim 1 where said catalyst is in an atomized form.

4. The system of claim 1 where said catalyst is atomized vanadium pentoxide.

5. The system of claim 1 where said turbulence creating zone is defined as a series of deflectors each including vanes radially displaced with respect to each other.

6. The system of claim 1 where the operation thereof is independent of any mechanical equipment.

7. The system of claim 1 where said deflector is disposed across the path of movement of said smoke and includes a series of openings.

8. The system of claim 1 where said deflector is in an inverted V configuration disposed across the path of movement of said smoke and includes a series of openings therein.

9. The system of claim 1 where said first treating chamber includes liquid recirculating means.

* * * * *